United States Patent
Whitford

(10) Patent No.: US 10,150,450 B2
(45) Date of Patent: Dec. 11, 2018

(54) HEATED WINDSHIELD WIPER SYSTEM

(71) Applicant: Blain Whitford, Amherstview (CA)

(72) Inventor: Blain Whitford, Amherstview (CA)

(*) Notice: Subject to any disclaimer, the term of this patent is extended or adjusted under 35 U.S.C. 154(b) by 0 days.

(21) Appl. No.: 15/162,227

(22) Filed: May 23, 2016

(65) Prior Publication Data
US 2017/0334401 A1   Nov. 23, 2017

(51) Int. Cl.
*B60S 1/38* (2006.01)
*B60S 1/08* (2006.01)

(52) U.S. Cl.
CPC .............. *B60S 1/3805* (2013.01); *B60S 1/08* (2013.01)

(58) Field of Classification Search
CPC ........ B60S 1/3803; B60S 1/3805; B60S 1/08; B60S 2001/3827
USPC ............. 15/250.05–250.09; 219/202, 203
See application file for complete search history.

(56) References Cited

U.S. PATENT DOCUMENTS

| | | | |
|---|---|---|---|
| 3,419,932 A * | 1/1969 | Linker | B60S 1/08 15/250.06 |
| 3,489,884 A * | 1/1970 | Waseleski, Jr. | B60S 1/3805 15/250.05 |
| 3,639,938 A * | 2/1972 | Golden | B60S 1/08 15/250.06 |
| 4,360,941 A | 11/1982 | Mabie | |
| 4,387,290 A * | 6/1983 | Yasuda | B60S 1/3805 15/250.07 |
| 5,325,561 A * | 7/1994 | Kotlar | B60S 1/3805 15/250.05 |
| D396,840 S | 8/1998 | Vita | |
| 5,787,543 A | 8/1998 | Selders | |
| 6,236,019 B1 * | 5/2001 | Piccione | B60S 1/3805 15/250.06 |
| 6,591,443 B1 | 7/2003 | Gilpin | |
| 6,779,222 B2 * | 8/2004 | Tobias | B60S 1/3805 15/250.07 |
| 7,568,256 B1 | 8/2009 | Addison | |
| 9,003,595 B2 | 4/2015 | Jones | |

FOREIGN PATENT DOCUMENTS

WO   WO2014012106   1/2014

* cited by examiner

Primary Examiner — Gary Graham

(57) ABSTRACT

A heated windshield wiper system includes a vehicle has a wiper motor and a windshield. The wiper motor is electrically coupled to the vehicle. A pair of windshield wipers is provided and each of the windshield wipers is movably coupled to the vehicle. Each of the windshield wipers is operationally coupled to the wiper motor. The wiper motor selectively urges each of the windshield wipers across the windshield. Thus, each of the windshield wipers may clear the windshield. A heating unit is coupled to each of the windshield wipers. The heating unit is electrically coupled to the wiper motor. The heating unit selectively heats each of the windshield wipers. Thus, each of the windshield wipers may melt snow and ice from the windshield.

1 Claim, 4 Drawing Sheets

HEATED WINDSHIELD WIPER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to heated wiper devices and more particularly pertains to a new heated wiper device for melting ice and snow on a windshield.

BRIEF SUMMARY OF THE INVENTION

An embodiment of the disclosure meets the needs presented above by generally comprising a vehicle has a wiper motor and a windshield. The wiper motor is electrically coupled to the vehicle. A pair of windshield wipers is provided and each of the windshield wipers is movably coupled to the vehicle. Each of the windshield wipers is operationally coupled to the wiper motor. The wiper motor selectively urges each of the windshield wipers across the windshield. Thus, each of the windshield wipers may clear the windshield. A heating unit is coupled to each of the windshield wipers. The heating unit is electrically coupled to the wiper motor. The heating unit selectively heats each of the windshield wipers. Thus, each of the windshield wipers may melt snow and ice from the windshield.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
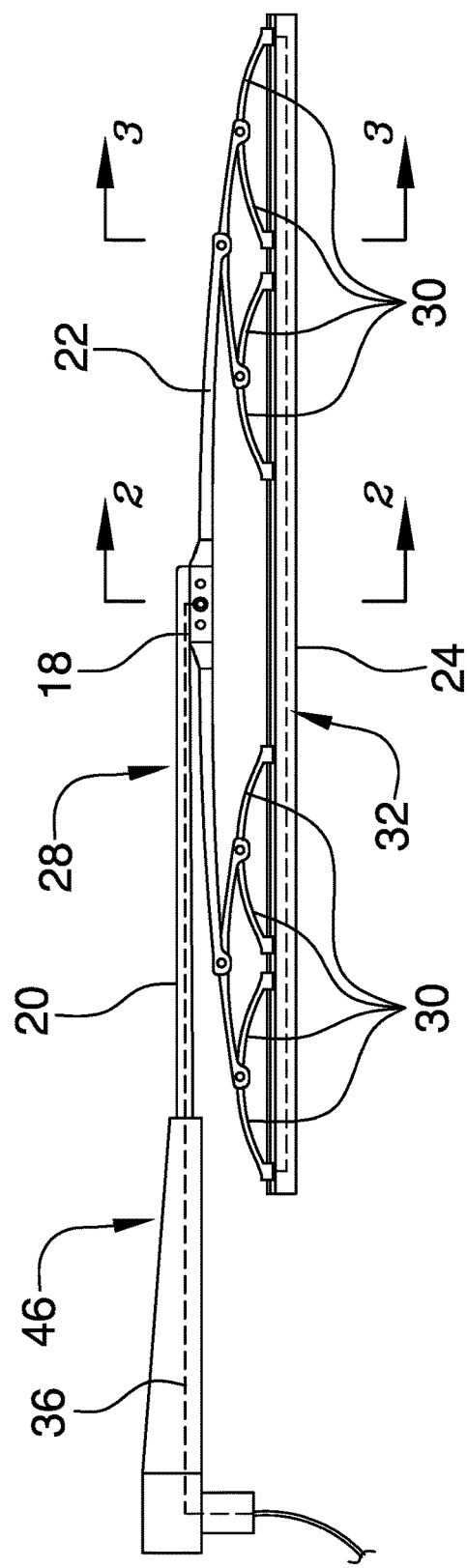
FIG. 1 is a right side view of a heated windshield wiper system according to an embodiment of the disclosure.
Figure 3:
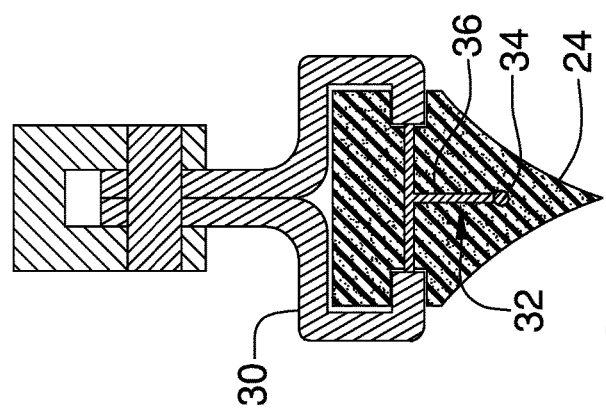
FIG. 3 is a cross sectional view taken along line 3-3 of FIG. 1 of an embodiment of the disclosure.
Figure 2:
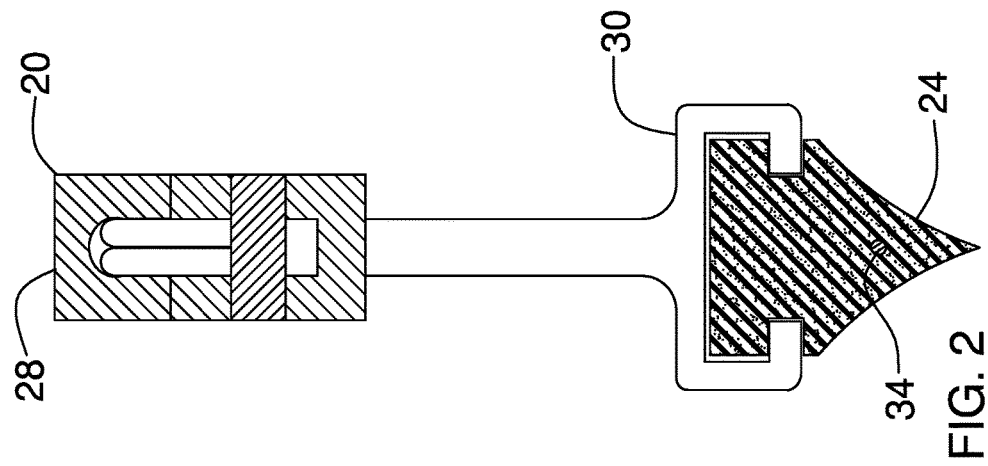
FIG. 2 is a cross sectional view taken along line 2-2 of FIG. 1 of an embodiment of the disclosure.
Figure 4:
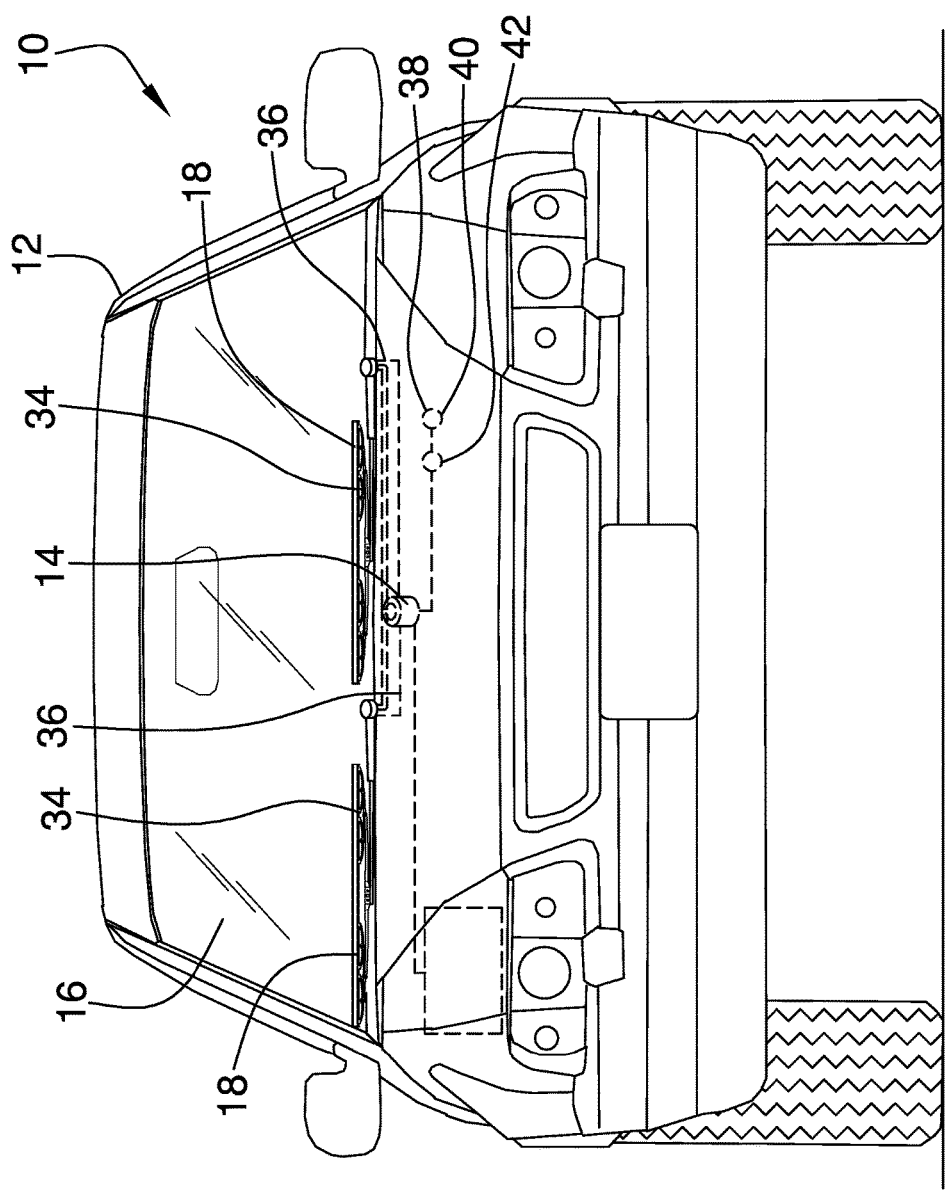
FIG. 4 is a perspective in-use view of an embodiment of the disclosure.
Figure 5:
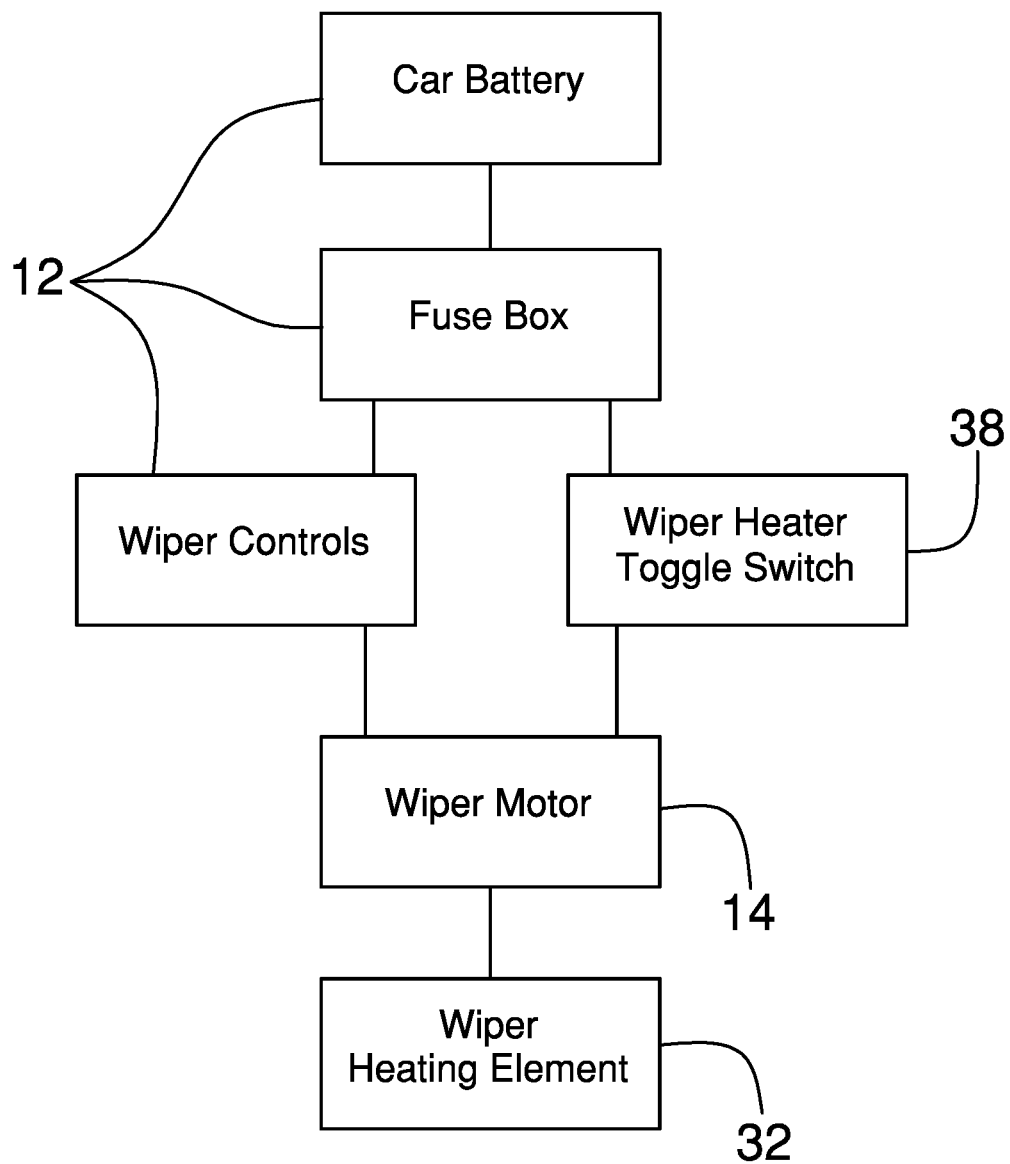
FIG. 5 is a schematic view of an embodiment of the disclosure.

With reference now to the drawings, and in particular to FIGS. 1 through 5 thereof, a new heated wiper device embodying the principles and concepts of an embodiment of the disclosure and generally designated by the reference numeral 10 will be described.

As best illustrated in FIGS. 1 through 5, the heated windshield wiper system 10 generally comprises a vehicle 12 that has a wiper motor 14 and a windshield 16. The wiper motor 14 is electrically coupled to the vehicle 12. The wiper motor 14 may comprise an electric motor or the like. The vehicle 12 may be a passenger vehicle or the like.

A pair of windshield wipers 18 is included and each of the windshield wipers 18 is movably coupled to the vehicle 12. Each of the windshield wipers 18 is operationally coupled to the wiper motor 14. Thus, the wiper motor 14 selectively urges each of the windshield wipers 18 across the windshield 16. Each of the windshield wipers 18 may clear the windshield 16 of rain and ice or other material.

Each of the windshield wipers 18 includes an arm 20, a bow 22 and a blade 24. The blade 24 corresponding to each of the windshield wipers frictionally engages the windshield 16. The arm 20 corresponding to each of the windshield wipers 18 is in mechanical communication with the wiper motor 14. The arm 20 corresponding to each of the windshield wipers 18 may include a first half 26 and a second half 28. The first half 26 may be comprised of a non-metallic material and the second half 28 may be comprised of a metallic material.

The bow 22 corresponding to each of the windshield wipers 18 may be movably coupled to the second half 28 of the corresponding windshield wiper 18. The bow 22 corresponding to each of the windshield wipers 18 may be comprised of a metallic material. The bow 22 may include a plurality of grips 30. The grips 30 may be spaced apart from each other and distributed along the bow 22. Each of the grips 30 may engage the blade 24. Thus, the blade 24 is coupled to the bow 22. The blade 24 corresponding to each of the windshield wipers 18 may be comprised of a flexible material such as silicon or the like.

A heating unit 32 is provided. The heating unit 32 is coupled to each of the windshield wipers 18 and the heating unit 32 is electrically coupled to the wiper motor 14. The heating unit 32 selectively heats each of the windshield wipers 18. Thus, each of the windshield wipers 18 may melt snow and ice from the windshield 16.

The heating unit 32 comprises a pair of heating elements 34. Each of the heating elements 34 is positioned within the blade 24 of an associated one of the windshield wipers 18. Each of the heating elements 34 is coextensive with the associated blade 24. Moreover, each of the heating elements 34 is in thermal communication with the associated blade 24 such that each of the heating elements 34 selectively heats the associated blade 24.

Each of the heating elements 34 may be in thermal communication with the grips 30 and the bow 22 corresponding to each of the windshield wipers 18. Thus, each of the heating elements 34 may inhibit ice and snow from collecting on the corresponding grips 30 and the bow 22. Each of the heating elements 34 may comprise an electrical heating element. Additionally, each of the heating elements 34 may have an operational temperature ranging between 100 degrees Fahrenheit and 120 degrees Fahrenheit.

A pair of conductors 36 is provided. Each of the conductors 36 is electrically coupled between the wiper motor 14 and an associated one of the heating elements 34. Each of the conductors 36 extends through the arm 20 and the bow 22 of an associated one of the windshield wipers 18. Each of the conductors 36 may comprise an electrical wire or the like.

A control 38 is positioned within the vehicle 12 and the control 38 may be manipulated. The control 38 is electrically coupled to each of the heating elements 34 such that the control 38 turns each of the heating elements 34 on and off. The control 38 may include an on/off knob 40 and a temperature knob 42. The on/off knob 40 may turn each of the heating elements 34 on and off. The temperature knob 42 may actuate each of the heating elements 34 between a minimum temperature and a maximum temperature.

In use, the control 38 is manipulated to turn on each of the heating elements 34 when snow and ice accumulates on the windshield 16. Thus, the blade 24 corresponding to each windshield wiper 18 melts the snow and ice on the windshield 16 thereby enhancing visibility. Moreover, each of the heating elements 34 heats the grips 30 and bow 20 of the corresponding windshield wiper 18. Thus, the ice and snow is inhibited from accumulating on the grips 30 and bow 22 of the corresponding windshield wipers 18.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A heated windshield wiper system comprising:

a vehicle having a wiper motor and a windshield, said wiper motor being electrically coupled to said vehicle;

a pair of windshield wipers, each of said windshield wipers being movably coupled to said vehicle, each of said windshield wipers being operationally coupled to said wiper motor such that said wiper motor selectively urges each of said windshield wipers across said windshield wherein each of said windshield wipers is configured to clear said windshield, each of said windshield wipers including an arm, a bow and a blade, said blade corresponding to each of said windshield wipers frictionally engaging said windshield, said arm corresponding to each of said windshield wipers being in mechanical communication with said wiper motor, said bow including a plurality of grips, said grips being spaced apart from each other and distributed along said bow, said grips coupling said blade to said bow; and a heating unit being coupled to each of said windshield wipers, said heating unit being electrically coupled to said wiper motor wherein said heating unit is electrically coupled to said vehicle, said heating unit being configured to selectively heat each of said windshield wipers wherein each of said windshield wipers is configured to melt snow and ice from said windshield, said heating unit comprising:

a pair of heating elements, each of said heating elements being positioned within said blade of an associated one of said windshield wipers, each of said heating elements being coextensive with said associated blade, each of said heating elements being in thermal communication with said associated blade such that each of said heating elements selectively heats said associated blade, a pair of conductors, each of said conductors being electrically coupled between said wiper motor and an associated one of said heating elements, each of said conductors extending through said arm, said bow, and into said blade, each said conductor extending between opposed portions of an associated one of said grips and being exposed to a distal end of said opposed portions of said associated one of said grips relative to said bow wherein heat is transferred to said associated one of said grips, and a control being positioned within said vehicle wherein said control is configured to be manipulated, said control being electrically coupled to each of said heating elements such that said control turns each of said heating elements on and off.

\* \* \* \* \*